T. N. SMITH & D. K. BRIGGS.
M. J. BRIGGS, EXECUTRIX OF D. K. BRIGGS, DEC'D.
BOILER GRATE.
APPLICATION FILED JUNE 21, 1915.
Reissued Oct. 10, 1916. 14,202.
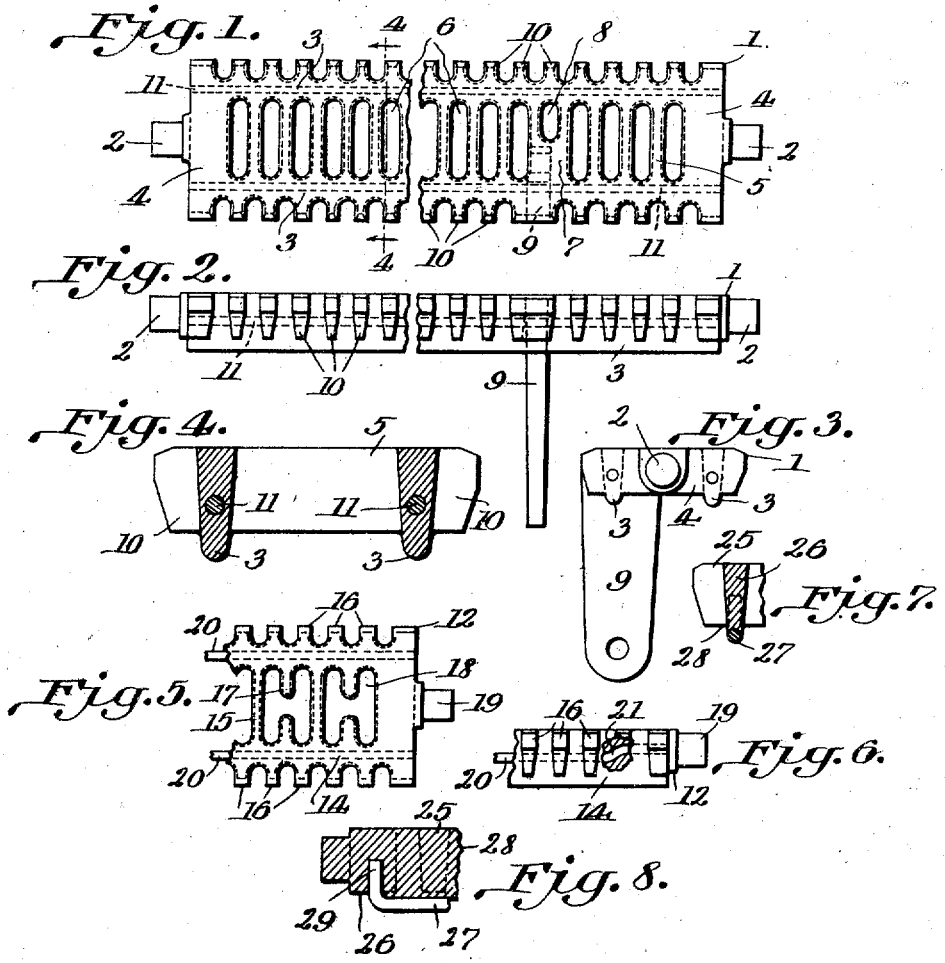
Inventors:
Thomas N. Smith
Mary J. Briggs, Executrix of
David K. Briggs, deceased
Per George W. Ramsey, Atty.

UNITED STATES PATENT OFFICE.

THOMAS N. SMITH AND DAVID K. BRIGGS, DECEASED, OF PORTSMOUTH, VIRGINIA, BY MARY JANE BRIGGS, OF PORTSMOUTH, VIRGINIA, EXECUTRIX OF SAID DAVID K. BRIGGS; SAID INVENTORS ASSIGNORS OF ONE-THIRD TO SAMUEL B. ANDREWS, OF PORTSMOUTH, VIRGINIA.

BOILER-GRATE.

14,202. Specification of Reissued Letters Patent. Reissued Oct. 10, 1916.

Original No. 1,121,791, dated December 22, 1914, Serial No. 769,529, filed May 23, 1913. Application for reissue filed June 21, 1915. Serial No. 35,470.

*To all whom it may concern:*

Be it known that THOMAS N. SMITH, a citizen of the United States, residing in Portsmouth, in the county of Norfolk, State of Virginia, together with DAVID K. BRIGGS, deceased, late of Portsmouth, county of Norfolk, State of Virginia, did invent a new and useful Boiler-Grate, of which the following is a specification.

One object of the present invention is to provide a grate bar, internally reinforced, to the end that when the body portion of the grate bar breaks, the bar will be prevented from sagging or dropping adjacent the point of rupture.

Another object of the invention is to provide a grate bar combining a maximum amount of air space with a maximum strength to resist transverse rupture.

Another object of the invention is to provide a grate bar which is adequately reinforced against torsional strain.

A more particular object of this invention is to provide a grate bar, having a body portion formed of cast metal and draft openings therein, with spaced apart reinforcing bars embedded in the body portion beneath the upper surface thereof in such manner that the reinforcing bars will sustain the load and maintain the body portion in substantially normal working position when the body portion has failed as a load sustaining member.

It is within the scope of the invention to improve generally and to enhance the utility, of devices of that type to which the present invention appertains.

With the above and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawing:—Figure 1 shows one form of the invention in top plan; Fig. 2 is a side elevation of the structure shown in Fig. 1; Fig. 3 is an end elevation of the structure shown in Fig. 1; Fig. 4 is a transverse section on the line 4—4 of Fig. 1; Fig. 5 is a top plan of a modified form of the invention; Fig. 6 is a side elevation of the structure shown in Fig. 5; Fig. 7 is a transverse section showing a slight modification in the invention; and Fig. 8 is a longitudinal section of the structure shown in Fig. 7.

A furnace grate is in a certain sense a floor for supporting the combustible material and in order to supply oxygen to carry on combustion this floor is, in substantially all cases, provided with draft openings. Since cold air is admitted through the draft openings and extreme heat of the fire is above the grate bars, the grate bed is subjected to abrupt temperature changes which causes the bed to crack and break. In large furnaces, particularly where an intense heat is required, the grate is made in sections comprising individual independent grate bars, in order that when any portion of the grate fails the particular bar ruptured may be removed without disturbing other parts of the grate. In locomotives, especially, an intense heat is required and because of the vibration of the locomotive when running the entire grate is constantly subjected to stresses in all directions. In view of the fact that locomotive grates are particularly subjected to severe conditions of use, they have heretofore very frequently broken. When a locomotive grate bar breaks it is impossible to fire the locomotive without danger of ruining the entire grate, because of fire dropping through into the ash pan, and consequently the failure of a grate bar necessitates taking the engine out of commission. This of necessity delays traffic, disturbs schedules, and temporarily disorganizes service. Like conditions, although perhaps not so severe, often occur in connection with steam ship furnaces and in furnaces under stationary boilers wherein the failure of grate bars may cause the shutting of the particular boiler of the ship or the closing down of a boiler in a mill.

To meet the above specified conditions and to improve the known existing devices we have invented and produced a grate bar wherein the reinforcing members are beneath the upper surface of the bar in such relation thereto that any transverse breakage of the cast metal in the grate bar does not affect the reinforcing devices and does not permit any portion of the grate bar to rotate, or be thrown out of substantial alinement, so that even though the cast metal portions of the grate bar fail the bar will still be supported and the bed for the fire retained in working condition.

This invention has been in practical use in thousands of grate bars in service in locomotive fire boxes, and this practical use has shown that the invention increases the life of a grate bar many times over any other form of grate bar known to applicants. Furthermore, the ultimate failure of a grate bar is so slow and long delayed that ample warning is given which enables the weak grate bar to be replaced prior to complete failure. Furthermore, grates in a locomotive are very heavy, usually weighing several thousand pounds, and this invention permits of the use of much less cast metal thus eliminating unnecessary weight and providing for economy both in installation and in maintenance.

The invention will now be explained specifically by reference to the drawings.

The grate bar herein disclosed is denoted by the numeral 1 and may be provided at its ends with trunnions 2 whereby the bar may be supported for rocking movement. The bar 1 comprises longitudinal ribs 3, thickened end portions 4 uniting the ribs 3, and connections 5 uniting the ribs 3. The connections 5 and the ribs 3 define a plurality of transverse openings 6, disposed in a line extending from one end of the grate to the other. One of the connections, denoted specifically by the numeral 7 is broader than the other connections and the corresponding opening 8 is decreased in length to provide for the formation of a shaker-lug 9 shown in Figs. 2 and 3. Tongues 10 project from the outer edges of the ribs 3, the tongues 10 alternating with the connections 5. Especial attention is directed to the alternating relation existing between the tongues 10 and the connections 5, since, by this construction, a maximum amount of metal remains at the ends of the openings 6.

The grate herein disclosed is preferably fashioned from cast iron. Embedded in the ribs 3 are reinforcing elements 11. The reinforcing elements 11 preferably are bars of wrought iron or steel. The bars 11 are inclosed circumferentially and throughout their entire lengths within the ribs 3.

Owing to the fact that the reinforcing elements 11 are provided, the grate bar will not drop should the cast body portion thereof be broken transversely. It is to be observed that the reinforcing bars 11 do not intersect the openings 6 but lie completely within the contour of the ribs 3. As a consequence, continuous longitudinal portions of the grate bar are reinforced by the members 11. In this connection, it is to be noted, again, that the tongues 10 are disposed in alternating relation with respect to the connections 5, the entire construction under discussion serving to increase the strength of the bar greatly.

In Fig. 5, the bar 12 comprises ribs 14, connections 15 between the ribs, and tongues 16 alternating with the connections 15, as hereinbefore described. In this form of the invention, however, short lugs 17 project inwardly, toward each other, from the ribs 14, the openings 18 being therefore of H shape. The trunnions are denoted by the numeral 19 and the reinforcing elements 20 are placed as hereinbefore described.

Referring to Fig. 6, and noting the point at which the reference character 21 is applied, it will be observed that the reinforcing elements 20 are shouldered, the shoulders, ordinarily, although not necessarily, being formed by offsetting the reinforcing elements slightly. Owing to the fact that the reinforcing elements 20 are shouldered as indicated at 21, any tendency toward relative longitudinal movement between the reinforcing elements 20 and the body portions of the bar will be prevented, and as a consequence, the bar will remain in a straight line, and will not sag, even when the cast body of the bar has been ruptured. The feature indicated at 21 is applicable to that form of the invention which is shown in Fig. 1, and may constitute a part thereof. Since each bar is reinforced, upon opposite sides of its longitudinal center, by the elements 11, torsional strains are provided for adequately. A maximum air space is combined with a maximum strength to resist transverse rupture; combustion of fuel is enhanced, the bar is made of peculiar efficiency in pulverizing and grinding cinders, and a dropping of the severed ends of a broken bar is prevented.

Referring to Figs. 7 and 8, the grate bar is denoted generally by the numeral 25 and comprises one or more longitudinal ribs 26. The reinforcing element is denoted by the numeral 27 and the lower edge of the rib 26 is grooved as indicated at 28 to receive the reinforcing element. In Figs. 7 and 8, the reinforcing element is, therefore, but partially embedded in the grate bar. At its ends, the reinforcing element 27 is equipped with an upstanding finger 29 which enters the body portion of the grate bar. The finger 29 exercises the same function as the off set 21 shown in Fig. 6, and prevents relative longitudinal movement between the reinforcing element and the grate bar proper.

It is to be noted especially that the reinforcing members are tension members, whereas the cast portion of the grate bar between the upper surface of the grate bar and the reinforcing members, is the compression part of the grate bar. By this construction it is evident that the cast part of the grate bar can be broken by any number of through and through cracks, as very frequently occurs due to many and various reasons, and at the same time the compression portion of the grate bar is completely operative to withstand compression forces. As a matter of fact the load of the fuel upon applicants' grate bar tends to press the cracked portions more firmly together so that through and through cracks which destroy the utility of any other known bar do not seriously affect this device. While it is not entirely necessary, it is preferable that the reinforcing members be located below the horizontal neutral axis of the grate bar. As above stated, the reinforcing members are primarily tension members, but use demonstrates that they are capable of sustaining load even when the entire cast body has been burned out of a short section of the grate bar. It is an especial and essential part of the present invention that the reinforcing members be so located relative to the upper or bed portion of the grate bar that no portion of the grate bar will rotate relative to another portion of the grate bar when the cast portion is entirely severed by a plurality of through and through cracks, and for this reason the effective portions of the reinforcing device are arranged so that the reinforcing element cannot become a support around which broken sections of cast metal may rotate when the body portion is broken.

Having thus described the invention, what is claimed is:—

1. In a device of the class described, a grate bar comprising a body provided at its ends with journaling means; and reinforcing elements engaged throughout their lengths with the body, portions of the body being interposed between the reinforcing elements and the fire supporting surface of the bar, the reinforcing elements being located upon opposite sides of the line of centers of the journaling means and being of greater tensile strength than the body, thereby to resist a torsional strain in the body when the latter is rocked on the journaling means.

2. In a device of the class described, a grate bar comprising a body provided at its ends with journaling means; and reinforcing elements engaged throughout their lengths with the body, the reinforcing elements being located upon opposite sides of the line of centers of the journaling means and being of greater tensile strength and of greater fire resisting qualities than the body, thereby to prevent a simultaneous burning out of the body and the reinforcing elements, and to maintain the bar operative to resist torsion when the bar is rocked on the journaling means.

3. As an article of manufacture, a grate bar including an integral body member having a bed portion provided with draft openings, and reinforcing means of greater tensile strength than said body member and embedded in said body member and below the upper surface thereof so that a transverse failure of the body member intersects a plurality of horizontally spaced effective portions of said reinforcing means disposed without the center line of said body member, said reinforcing means comprising a tension member and the metal of the body above said means comprising a compression member, said reinforcing means being arranged and constructed to maintain the ends of a ruptured part of the body member in substantial alinement when the said body member of the grate bar has entirely failed as a load sustaining element.

4. As an article of manufacture, a grate bar comprising an integral cast metal body portion having a relatively flat bed provided with draft openings, cast in wrought metal reinforcing means within said body portion and on each side of the draft openings and constructed and arranged to prevent rotation of any part of said body portion relative to any other part of said body portion when said body portion is broken by through and through cracks, and to sustain said body portion and the load thereon when this portion has failed as a load sustaining member.

5. As an article of manufacture, a grate bar having an integral body member formed of cast metal with a relatively flat bed portion provided with draft openings, and wrought metal reinforcing means cast within said body member with effective portions horizontally separated and below the upper surface thereof and constructed so that a transverse failure of the body member intersects a plurality of effective portions of said reinforcing means thereby maintaining the ends of a ruptured part of the body member in substantial alinement when the cast portion of said grate bar has entirely failed as a load sustaining member.

6. As an article of manufacture, an integral grate bar having a body portion provided with draft holes therein and constructed to form a bed, and reinforcing means of substantially uniform cross section having effective portions horizontally disposed relative to said body portion and below the upper surface thereof and on opposite sides of the draft holes, the cast metal above said reinforcing means comprising a compression part of the grate bar, said reinforcing means being entirely inclosed in cast metal and comprising an auxiliary tension member, and said reinforcing means being constructed and arranged to sustain the full load and maintain the separated parts of said cast metal body portion in substantial alinement when said body portion has broken and failed as a load sustaining member.

7. In a device of the class described, a grate bar comprising an integral cast metal body portion in combination with, reinforcing elements engaged throughout their lengths with body, portions of the body being interposed between the reinforcing elements and the fire supporting surface of the grate bar, the reinforcing elements being located upon opposite sides of a vertical plane including the longitudinal center line of the grate bar, and being of greater tensile strength than the body thereby to resist tension and torsional strains.

8. In a device of the class described, a grate bar comprising an integral cast metal body portion in combination with, round reinforcing rods cast within said body portion and completely surrounded by cast metal throughout their entire lengths, the reinforcing rods being located on opposite sides of a vertical plane including the longitudinal center line of the grate bar and being of greater tensile strength than the body thereby to resist tension and torsional strains.

THOMAS N. SMITH.
MARY J. BRIGGS,
*Executrix of David K. Briggs, deceased.*

Witnesses:
T. B. Coker,
F. T. Briggs.